(12) United States Patent
Peyron et al.

(10) Patent No.: US 11,772,810 B2
(45) Date of Patent: Oct. 3, 2023

(54) AIRCRAFT NACELLE COMPRISING AT LEAST ONE HEAT EXCHANGER

(71) Applicant: Safran Nacelles, Gonfreville l'Orcher (FR)

(72) Inventors: Vincent Peyron, Moissy Cramayel (FR); Jean-Nicolas Bouchout, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 320 days.

(21) Appl. No.: 16/839,145

(22) Filed: Apr. 3, 2020

(65) Prior Publication Data
US 2020/0317358 A1 Oct. 8, 2020

(30) Foreign Application Priority Data

Apr. 3, 2019 (FR) ...................................... 1903542

(51) Int. Cl.
*B64D 33/10* (2006.01)
*B64D 27/18* (2006.01)
(Continued)

(52) U.S. Cl.
CPC ............. *B64D 33/10* (2013.01); *B64D 27/18* (2013.01); *B64D 29/02* (2013.01); *B64D 33/02* (2013.01);
(Continued)

(58) Field of Classification Search
CPC .. B64D 2033/022; B64D 27/18; B64D 29/02; B64D 33/02; B64D 33/10; B64D 33/12;
(Continued)

(56) References Cited

U.S. PATENT DOCUMENTS

| 2008/0053099 A1 | 3/2008 | Venkataraman et al. |
| 2010/0212857 A1* | 8/2010 | Bulin ...................... F02C 7/224 |
| | | 165/41 |

(Continued)

FOREIGN PATENT DOCUMENTS

| FR | 3002978 | 9/2014 |
| WO | 2010136710 | 12/2010 |
| WO | 2015136210 | 9/2015 |

OTHER PUBLICATIONS

Preliminary Search Report for French Application 1903542, dated Nov. 20, 2019.
Leplat et al., Etude numérique d'échangeurs de chaleur surfaciques à ailettes pour un turboréacteur, Revue Scientifique des Ingénieurs Industriels, 2013, 21 pgs, vol. 27.

*Primary Examiner* — Scott J Walthour
(74) *Attorney, Agent, or Firm* — Burris Law, PLLC

(57) ABSTRACT

An aircraft includes a fuselage disposed in a longitudinal plane and two propulsion units disposed in a plane transverse to the longitudinal plane, on either side of the fuselage. A nacelle for use in the aircraft includes a proximal upper dial, a distal upper dial, a proximal lower dial, a distal lower dial, an upstream section, a middle section, a downstream section having a trailing edge, and at least one surface heat exchanger, called a cold source exchanger, between a heat transfer fluid and a cold air flow, integrated into a closed circuit in which the heat transfer fluid circulates, and disposed in any one of the proximal upper, distal upper and/or distal lower dials, and in the middle and/or downstream section(s).

15 Claims, 3 Drawing Sheets

(51) Int. Cl.
*B64D 29/02* (2006.01)
*B64D 33/02* (2006.01)
*F02C 7/16* (2006.01)
*F28D 9/00* (2006.01)
*F28D 21/00* (2006.01)

(52) U.S. Cl.
CPC .............. *F02C 7/16* (2013.01); *F28D 9/00* (2013.01); *F05D 2260/213* (2013.01); *F28D 2021/0021* (2013.01)

(58) Field of Classification Search
CPC ........ F02C 7/14; F02C 7/16; F05D 2260/213; F28D 2021/0021
See application file for complete search history.

(56) References Cited

U.S. PATENT DOCUMENTS

| | | | |
|---|---|---|---|
| 2013/0219854 A1 | 8/2013 | Alecu | |
| 2015/0377130 A1* | 12/2015 | Xu | F02C 7/36 60/39.093 |
| 2016/0230595 A1* | 8/2016 | Wong | B23P 15/26 |
| 2017/0167382 A1* | 6/2017 | Miller | F01D 11/24 |
| 2018/0163566 A1 | 6/2018 | Fang et al. | |
| 2018/0230911 A1* | 8/2018 | Pastouchenko | F01D 25/24 |
| 2018/0328285 A1* | 11/2018 | Tajiri | F28F 1/325 |
| 2020/0165982 A1* | 5/2020 | Smith | F02K 3/115 |
| 2020/0224975 A1* | 7/2020 | Palmer | F28D 9/0093 |

* cited by examiner

AIRCRAFT NACELLE COMPRISING AT LEAST ONE HEAT EXCHANGER

CROSS-REFERENCE TO RELATED APPLICATIONS

This application claims priority to and the benefit of FR 19/03542 filed on Apr. 3, 2019. The disclosure of the above application is incorporated herein by reference.

FIELD

The present disclosure relates to the field of the turbojet engine cooling systems for an aircraft.

BACKGROUND

The statements in this section merely provide background information related to the present disclosure and may not constitute prior art.

An aircraft comprises a fuselage, one or several wing(s) and one or several propulsion unit(s) each comprising a turbojet engine housed in a nacelle. Each propulsion unit is attached to the aircraft by a strut generally located under or on a wing or at the fuselage of the aircraft.

A turbojet engine can also be called motor. In the following description, the terms "motor" and "turbojet engine" will be used interchangeably.

More particularly, in the case of an aircraft comprising two propulsion units, each propulsion unit is disposed on either side of the fuselage.

A nacelle generally has a tubular structure comprising an upstream section comprising an air inlet upstream of the turbojet engine, a middle section intended to surround a fan of the turbojet engine, a downstream section capable of accommodating thrust reversal means and intended to surround the combustion chamber of the turbojet engine, and is generally terminated by an ejection nozzle whose outlet is located downstream of the turbojet engine.

Furthermore, a nacelle usually comprises an outer structure comprising a fixed portion and a movable portion (thrust reversal means), and an inner fixed structure (IFS), concentric with the outer structure. The inner fixed structure surrounds the core of the turbojet engine rearward of the fan. These outer and inner structures define an annular flow path, also called secondary flow path, aimed at channeling a cold air flow, called secondary air flow, which circulates outside the turbojet engine.

The outer structure comprises an outer fairing defining an outer aerodynamic surface, and an inner fairing defining an inner aerodynamic surface, the inner and outer fairings being connected upstream by a leading edge forming the air inlet lip.

In general, the turbojet engine comprises a set of blades (compressor and possibly fan or unducted propeller) driven in rotation by a gas generator through a set of transmission means.

A lubricant distribution system is provided in the turbojet engine to ensure a good lubrication of these transmission means and to cool them. The lubricant is oil. In the following description, the terms "lubricant" and "oil" will be used interchangeably.

A lubricant cooling system comprising a heat exchanger allows cooling the lubricant.

There are lubricant cooling systems comprising an air/oil exchanger using the cold air from the secondary flow path of the nacelle or from one of the first stages of the compressor to cool the oil of the turbojet engine. Such an exchanger is a finned exchanger. It comprises fins in the cold air flow which disturb the flow of the air flow in the secondary flow path or in the compressor, which results in pressure losses (drag), and therefore performance losses for the aircraft in terms of fuel consumption (FB (Fuel Burnt) parameter).

There are also cooling systems comprising an air/oil exchanger using cold air withdrawn from outside the nacelle by a scoop disposed on the outer fairing of the nacelle, the cold air being circulated through the exchanger and which can be used for de-icing the nacelle by circulation in conduits disposed in contact with the walls of the outer structure of the nacelle, for example at the air inlet lip. Such a cooling system allows a better control of the exchanged thermal energies, but the presence of scoops in the outer fairing of the nacelle results in a loss of aerodynamic performance, in the same manner as a finned exchanger, and therefore losses of performance for the aircraft in terms of fuel consumption (FB (Fuel Burnt) parameter).

There are also cooling systems comprising a heat exchanger, called hot source exchanger, between a heat transfer fluid and the motor oil, and a heat exchanger, called cold source exchanger, between the heat transfer fluid and the air. Such a cooling system comprises a conduit for circulating the heat transfer fluid in a closed circuit. More particularly, the conduit for circulating the heat transfer fluid comprises a portion disposed in the nacelle in contact with the outer and/or inner fairing(s), said portion forming the cold source heat exchanger. This is referred to as a surface exchanger. Even more particularly, the portion disposed in the nacelle in contact with the inner and/or outer fairing(s) comprises a plurality of channels disposed in parallel, said channels being formed by a double wall of the inner and/or outer fairing(s). This is referred to as a structural exchanger.

Thus, the cooling systems of the turbojet engine comprise at least one heat exchanger disposed in the nacelle.

The different phases of flight of an aircraft are taxi, fixed point before take-off, take-off or aborted take-off, climb, cruise, descent, approach, aborted landing, braking with a thrust reversal.

During the different phases of flight, a nacelle is subjected to impacts such as bird or debris impacts, which can deteriorate the nacelle and damage the heat exchangers it comprises, and thus degrade the reliability of the turbojet engine.

More particularly, a nacelle of an aircraft comprising two propulsion units disposed on either side of the fuselage, is subjected to impacts of debris originating from projections of the opposite propulsion unit. The bird impacts, in turn, take place more precisely at the upstream section.

SUMMARY

This section provides a general summary of the disclosure and is not a comprehensive disclosure of its full scope or all of its features.

The present disclosure provides a nacelle comprising an exchanger which is not subjected to such impacts.

For this purpose, the present disclosure relates to a nacelle for an aircraft comprising a fuselage disposed in a longitudinal plane and at least two propulsion units disposed in a plane transverse to the longitudinal plane, on either side of the fuselage, the nacelle being substantially tubular and being divided into four substantially identical dials between an upper point, a lower point, a proximal lateral point relative to the longitudinal plane and a distal lateral point relative to the longitudinal plane, such that the nacelle comprises:
- a proximal upper dial,
- a distal upper dial,
- a proximal lower dial, and
- a distal lower dial.

The nacelle further comprises:
- an upstream section comprising a leading edge forming an air inlet lip,
- a middle section, and
- a downstream section comprising a trailing edge, characterized in that the nacelle comprises at least one surface heat exchanger, called cold source exchanger, between a heat transfer fluid and a cold air flow, the cold source exchanger being integrated into a closed circuit in which the heat transfer fluid circulates, and disposed in any one of the proximal upper, distal upper and/or distal lower dials, and in the middle and/or downstream section(s).

Thus, at least one cold source exchanger is located in an area that cannot be impacted by birds or debris originating from projections of the opposite propulsion unit.

Such a surface heat exchanger aims at cooling the heat transfer fluid in contact with the cold air flow.

According to other features of the present disclosure, the nacelle of the present disclosure comprises one or more of the following optional features considered alone or according to all possible combinations.

The cold source exchanger is intended to cooperate with an exchanger called hot source exchanger between a lubricant of the turbojet engine and the heat transfer fluid, in the closed circuit. According to this feature, the cold source exchanger is integrated into a cooling system comprising the cold source exchanger, the hot source exchanger and a heat transfer fluid circulation conduit in a closed loop.

According to one feature, the nacelle comprises an outer structure comprising an outer fairing defining an outer aerodynamic surface, and an inner fairing defining an inner aerodynamic surface, the inner and outer fairings being connected upstream by the leading edge forming the air inlet lip, and the cold source exchanger being disposed in contact with the inner and/or outer fairing(s) of the nacelle.

According to this feature, the closed circuit comprises a conduit for circulating the heat transfer fluid comprising a portion disposed in the nacelle in contact with the outer and/or inner fairing(s), said portion forming the cold source exchanger.

According to one feature, the cold source exchanger comprises a plurality of channels disposed in parallel. Thus, the portion of the conduit for circulating the heat transfer fluid forming the cold source exchanger comprises a plurality of channels.

According to one feature, the cold source exchanger is formed at least partially by a double wall of at least one of the inner fairing and the outer fairing of the nacelle.

The term "double wall of the fairing" means that the cold source exchanger comprises an area in contact with the air formed by the outer or inner fairing of the nacelle.

According to one feature, an expansion tank is disposed in the closed circuit, in order to define at least one of a maximum pressure and a minimum pressure in some portions of the closed circuit.

The expansion tank is a closed sealed expansion tank.

According to one feature, the nacelle comprises at least two cold source exchangers, comprising at least one exchanger, called first cold source exchanger, is disposed in any one of the proximal upper, distal upper and/or distal lower dials, and in the middle and/or downstream section(s).

According to one feature, at least one cold source exchanger is disposed in contact with the inner fairing of the nacelle and at least one cold source exchanger is disposed in contact with the outer fairing of the nacelle.

The cold source exchanger disposed in contact with the inner fairing allows carrying out a heat exchange during taxiing of the aircraft. Thus, when the cold source exchanger is integrated into a cooling system as previously described, it allows covering the needs for heat dissipation of the turbojet engine during taxiing of the aircraft. The cold source exchanger disposed in contact with the outer fairing allows carrying out a heat exchange during the take-off, the climb, the cruise, the descent, the approach, the landing and the braking of the aircraft. Thus, when the cold source exchanger is integrated into a cooling system as previously described, it allows covering the needs for heat dissipation of the turbojet engine during these different phases of flight of the aircraft.

A nacelle according to this feature therefore allows obtaining enhanced cooling of the turbojet engine.

According to one feature, the nacelle comprises at least one exchanger, called second cold source exchanger, disposed in at least one of the upstream section and the proximal lower dial.

Thus, several surfaces of the nacelle are used for cooling the heat transfer fluid, at least one of which meets safety requirements and in particular external events such as bird or debris impacts.

According to one feature, the cold source exchangers are integrated in parallel in the closed circuit in which the heat transfer fluid circulates.

According to one feature, a valve allows closing the heat transfer fluid circulation in the second cold source exchanger.

According to one feature, the nacelle comprises a leak detection device, allowing detecting a leak in the second cold source exchanger.

The leak detection device is advantageously disposed in the closed circuit.

The valve is designed to be opened or closed according to the information of the leak detection device.

According to one feature, the cold source exchangers are integrated into different closed circuits, in which the heat transfer fluid circulates. This is referred to as independent circuits.

According to one feature, the first cold source exchanger is integrated into a main circuit and the second cold source exchanger is integrated into a secondary circuit such that the heat transfer fluid circulating in the secondary circuit is withdrawn from the expansion tank at a withdrawal point, and in one form, at a height such that the ratio between this height and the height of heat transfer fluid remaining above the withdrawal point is close to the ratio of the heat transfer fluid volumes present respectively in the main and secondary circuits.

The term "main circuit" means a closed circuit comprising the expansion tank, the first cold source exchanger and the hot source exchanger with which it is intended to cooperate. The secondary circuit, however, is a closed circuit comprising the second cold source exchanger. It communicates with the main circuit via the expansion tank.

According to one feature, the second cold source exchanger is disposed at least partially in the air inlet lip.

The cold source exchanger disposed in the air inlet lip allows carrying out a heat exchange during the taxiing of the aircraft and allows carrying out a de-icing function of the air inlet lip.

According to one feature, the nacelle comprises a plurality of cold source exchangers, each being disposed in any one of the proximal upper, distal upper and/or distal lower dials, and in the middle and/or downstream section(s).

According to one feature, the nacelle comprises a plurality of cold source exchangers, each being disposed in the proximal upper dial and/or the distal upper dial, and in the middle and/or downstream section(s) of the nacelle.

According to one feature, the nacelle comprises a plurality of cold source exchangers, each being disposed in at least one of the distal upper dial and the distal lower dial.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
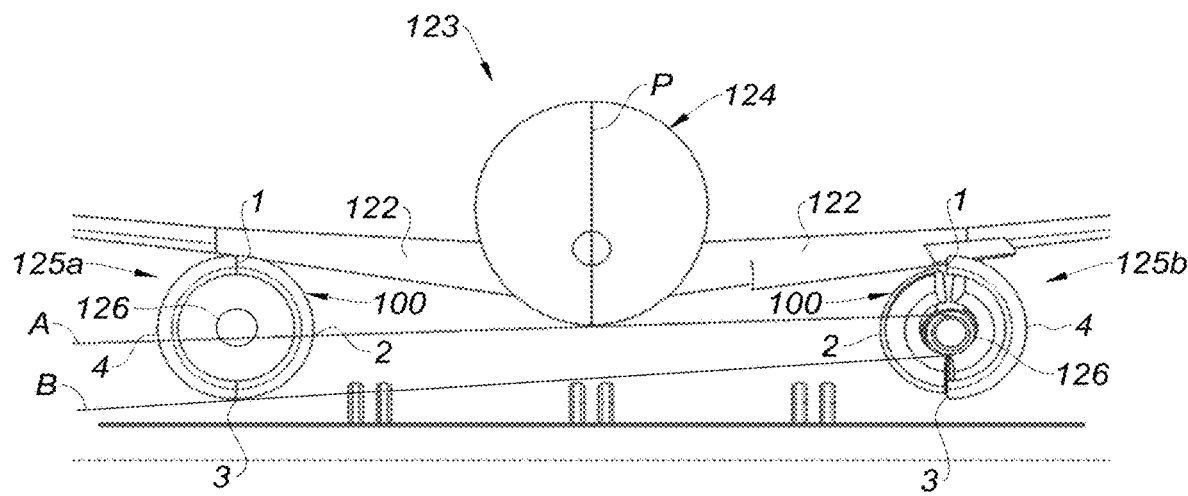
FIG. 1 is a schematic cross-sectional view of an aircraft comprising two propulsion units comprising a nacelle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description and in the claims, similar or analogous identical components will be designated by the same reference numerals and the terms "upstream," "downstream," "upper," "lower," etc. will be used without limitation and with reference to the drawings in order to facilitate the description.

FIG. 1 illustrates an aircraft 123 in a front view, that is to say from its front face in the direction of displacement of the aircraft, comprising a fuselage 124, two wings 122, and two left 125a and right 125b propulsion units respectively. The fuselage 124 extends longitudinally along a longitudinal plane P.

Each propulsion unit 125a, 125b, comprises a turbojet engine 126, surrounded by a substantially tubular nacelle 100.

The propulsion units 125a, 125b, are disposed in the same plane transverse to the longitudinal plane P in which the fuselage 124 extends.

Each nacelle 100, comprises an upper point 1, a lower point 3, a proximal lateral point 2 relative to the longitudinal plane P and a distal lateral point 4 relative to the longitudinal plane P. Thus, each nacelle is divided into four dials, as indicated with reference to FIG. 3.

Each nacelle has, between the upper 1 and lower 3 points, a distal portion called "outboard" portion and a proximal portion called "inboard" portion.

Furthermore, each nacelle 100 of the propulsion units 125a, 125b has, between the proximal 2 and distal 4 lateral points, an upper portion, close to the wing 122, and an opposite lower portion.

Each nacelle 100 may be subjected to impacts of debris originating from projections of the opposite propulsion unit. These impacts can take place in the proximal lower or "inboard" portion of each nacelle. Indeed, the distal or "outboard" portion is not exposed and the proximal upper or "inboard" portion is protected by the fuselage 124.

The axes A and B delimit the area impactable by such debris from the nacelle 100 of the left propulsion unit 125a. This area corresponds to the proximal lower dial 41 illustrated in FIG. 3A.

Figure 2:
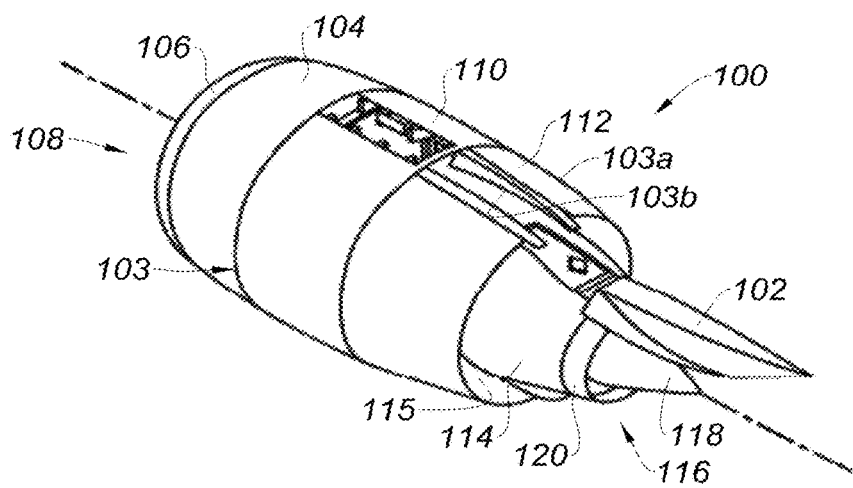
FIG. 2 is a schematic view of an aircraft turbojet engine nacelle according to the present disclosure.

FIG. 2 illustrates a nacelle 100 of FIG. 1, suspended from a mast 102 intended to be fastened to a wing 122 (FIG. 1) of the aircraft 123 of FIG. 1. The nacelle 100 comprises an outer structure 103 comprising an upstream section 104 provided with a lip 106 forming an air inlet 108, a middle section 110, and a downstream section 112.

The nacelle further comprises an inner fixed structure 114 surrounding a downstream portion of the turbojet engine 126 (FIG. 1) concentrically relative to the downstream section 112. The inner fixed structure 114 and the outer structure 103 delimit an annular flow path 115 defining a passage for a cold secondary air flow (not represented).

The nacelle 100 also comprises an ejection nozzle 116 comprising a gas ejection cone 118 and a gas ejection flare 120. The ejection cone 118 and the ejection flare 120 define a passage for a hot air flow (not represented) exiting the turbojet engine 126 (FIG. 1).

The outer structure 103 comprises an outer fairing 103a defining an outer aerodynamic surface, and an inner fairing 103b defining an inner aerodynamic surface, the outer 103a and inner 103b fairings being connected upstream by a leading edge wall forming the lip 106 of air inlet 108.

The nacelle 100 may be subjected to bird impacts at the upstream section 104.

Figure 3A:
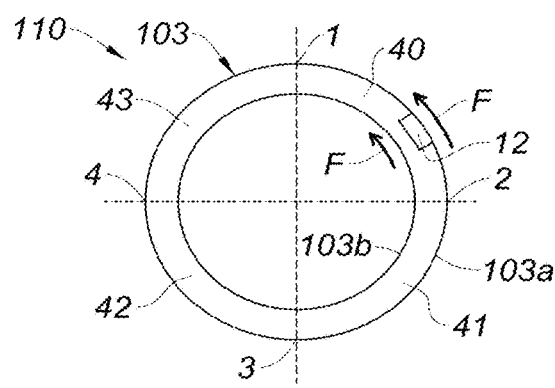
FIG. 3A is a sectional schematic view of a middle section of a nacelle according to the present disclosure intended to be disposed to the left of the longitudinal plane of an aircraft.
Figure 3B:
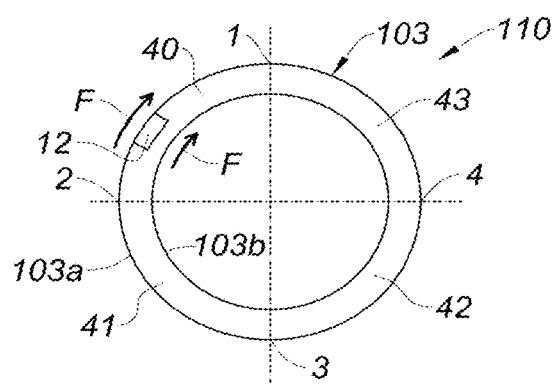
FIG. 3B is a cross-sectional schematic view of a middle section of a nacelle according to the present disclosure intended to be disposed to the right of the longitudinal plane of an aircraft.

FIGS. 3A and 3B illustrate an outer structure 103 of a nacelle 100, according to the present disclosure, cut at the middle section 110, the nacelles 100 being intended respectively to be disposed to the left and to the right of the longitudinal plane P of an aircraft (FIG. 1).

The middle section 110 is divided into four dials, respectively proximal upper 40, proximal lower 41, distal lower 42, and distal upper 43 dials.

The middle section 110 comprises a surface heat exchanger called cold source exchanger 12 between a heat transfer fluid C (FIG. 4) to be cooled and a cold air flow F. The cold source exchanger 12 is disposed in contact with the outer fairing 103a of the nacelle 100, in the proximal upper dial 40 of the middle section 110, such that it is not impacted by impacts of birds or debris originating from a nacelle of an opposite propulsion unit.

In one variant which is not represented, the cold source exchanger 12 is disposed in contact with the inner fairing 103b of the nacelle, in the proximal upper dial 40 of the middle section 110.

In variants which are not represented, the cold source exchanger 12 is disposed in the proximal upper dial 40 of the downstream section 112, in contact with the outer fairing 103a or inner fairing 103b.

In variants which are not represented, the cold source exchanger 12 is disposed in the distal upper dial 43 of the middle section 110 and/or downstream 112 section, in contact with the outer fairing 103a or inner fairing 103b.

In other variants which are not represented, several cold source exchangers 12 are disposed in the proximal upper dial 40 and/or in the distal upper dial 43 and/or in the distal lower dial, of the middle section 110 and/or downstream 112 section(s), in contact with the outer fairing 103a or inner fairing 103b.

In one form, the cold source exchanger 12 comprises a plurality of channels disposed in parallel. Furthermore, it is formed at least partially by a double wall of the inner and/or outer fairing(s) 103b and 103a, respectively, of the nacelle.

Figure 4:
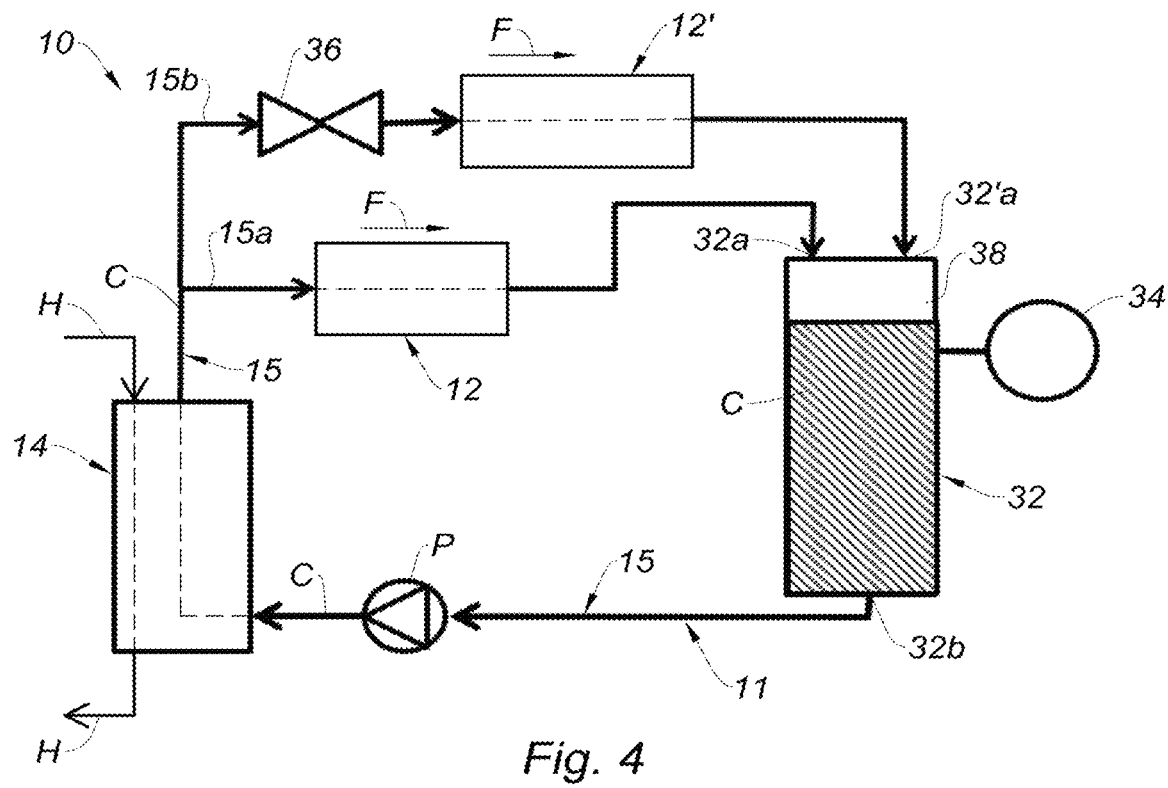
FIG. 4 is a schematic view of a first form of a cooling system comprising at least one heat exchanger disposed in a nacelle according to the present disclosure.

FIG. 4 illustrates a cooling system 10 comprising a first cold source exchanger 12, corresponding to the cold source exchanger 12 of FIG. 3, an exchanger called hot source exchanger 14 between a lubricant H of the turbojet engine 126 (FIG. 1) to be cooled and the heat transfer fluid C, and a second cold source exchanger 12'.

The cold source 12, 12' and hot source 14 exchangers are disposed in a closed circuit 11 comprising a conduit 15 for circulating the heat transfer fluid C, the first 12 and second 12' cold source exchangers being disposed in parallel in the closed circuit 11. The heat transfer fluid C circulates in the first cold source exchanger 12 via a first portion 15a of the circulation conduit 15, and it circulates in the second cold source exchanger 12' via a second portion 15b of the circulation conduit 15.

Figure 7:
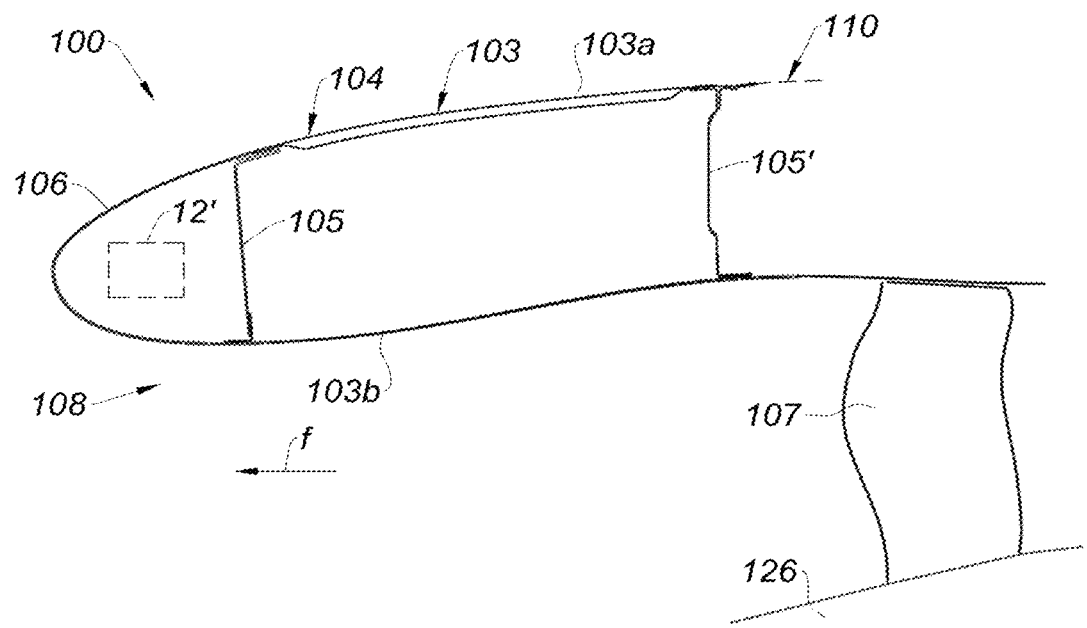
FIG. 7 is a longitudinal sectional schematic view of an air inlet lip of a nacelle according to the present disclosure.

The hot source exchanger 14 is disposed in the turbojet engine 126 (FIG. 1), while the second cold source exchanger 12' is disposed in the nacelle, in an area exposed to bird impacts, as will be shown in FIG. 7.

The cooling system 10 further comprises an expansion tank 32 in the closed circuit 11, between the cold source exchangers 12, 12' and the hot source exchanger 14.

The expansion tank 32 is sealed such that its volume is linked to the pressure of the conduit 15 for circulating the heat transfer fluid C.

The expansion tank 32 comprises a level sensor 34. It is filled with a heat transfer fluid C and with a gaseous headspace 38. It has two inlets 32a, 32'a of a heat transfer fluid C, respectively from the first cold source exchanger 12 and the second cold source exchanger 12', and an outlet 32b of a heat transfer fluid C.

A pump P allows the circulation of the heat transfer fluid C in the closed circuit 11.

A valve 36, disposed in the closed circuit 11 upstream of the second cold source exchanger 12', allows closing the circulation of a heat transfer fluid C in the second cold source exchanger 12', depending on the fluid level in the expansion tank. The valve 36 is disposed in the second portion 15b of the conduit 15 for circulating a heat transfer fluid C.

The level sensor 34 allows detecting a leak in the second cold source exchanger 12'. The level sensor 34 is therefore a leak detection device 34.

Alternatively, the closed circuit 11 comprises a leak detection device such as a pressure sensor for circulating the heat transfer fluid C, or sensors for comparing the inlet and outlet flow rates of the heat transfer fluid C in the expansion tank 32.

When the valve 36 is open, the heat transfer fluid C circulates in the closed circuit 11 via the circulation conduit 15, by passing into the first cold source exchanger 12 and into the second cold source exchanger 12', where it is cooled by the cold air F, then into the expansion tank, then the hot source exchanger 14 where it is heated by the lubricant H. Thus, the heat transfer fluid C cooled by the cold source exchangers 12, 12' allows cooling the lubricant H. The heat transfer fluid C is intended to circulate both in the cold source exchangers 12, 12' and in the hot source exchanger 14.

When the valve 36 is closed, the heat transfer fluid C circulates in the closed circuit 11 via the circulation conduit 15, by passing into the first cold source exchanger 12, where it is cooled by the cold air F, then into the expansion tank, then into the hot source exchanger 14 where it is heated by the lubricant H. Thus, the heat transfer fluid C cooled by the first cold source exchanger 12 allows cooling the lubricant H. The heat transfer fluid C is intended to circulate both in the first cold source exchanger 12 and in the hot source exchanger 14.

Figure 5:
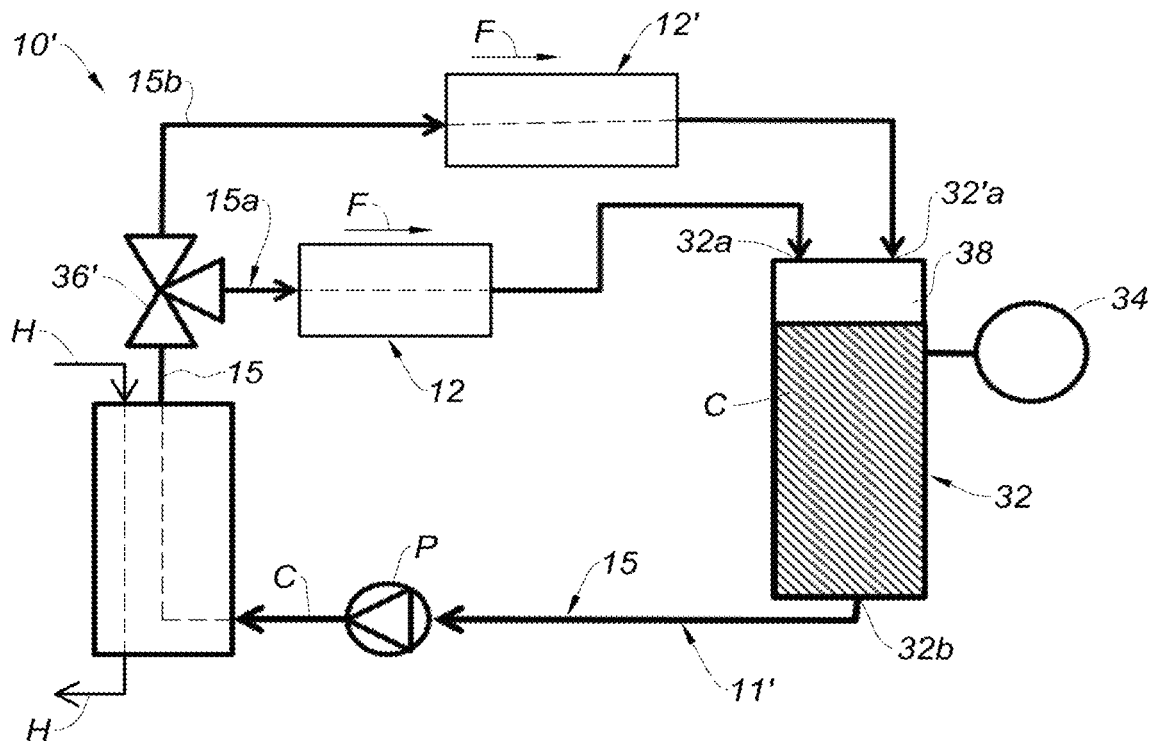
FIG. 5 is a schematic view of a second form of a cooling system comprising at least one heat exchanger disposed in a nacelle according to the present disclosure.

FIG. 5 illustrates a cooling system 10' according to a variant of FIG. 4.

In this variant, a valve 36' is disposed at the intersection between the first circulation conduit 15a of a heat transfer fluid C and the second circulation conduit 15b of a heat transfer fluid C. It is controlled depending on the fluid level in the expansion tank, on the de-icing requirement and on the cooling requirements.

This valve 36' is a three-way valve. It allows managing the flow rate of a heat transfer fluid C sent to the second cold source exchanger 12' or to the first cold source exchanger 12.

Figure 6:
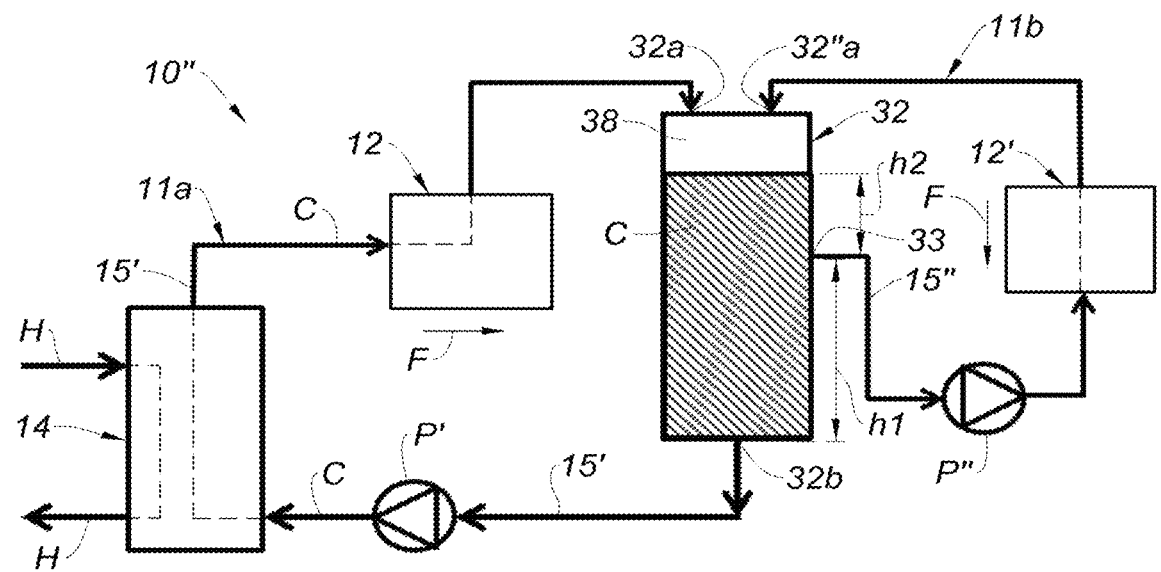
FIG. 6 is a schematic view of a third form of a cooling system comprising at least one heat exchanger disposed in a nacelle according to the present disclosure.

FIG. 6 illustrates a cooling system 10" according to a third variant.

In this variant, the first cold source exchanger 12 is integrated into a first closed circuit 11a and the second cold source exchanger 12' is disposed in a second closed circuit 11b. Thus, the first 12 and second 12' cold source exchangers are integrated into different closed circuits 11a, 11b.

Each closed circuit 11a, 11b comprises a conduit for circulating the heat transfer fluid. For this purpose, the first closed circuit 11a comprises a first circulation conduit 15' and the second closed circuit 11b comprises a second circulation conduit 15".

The first closed circuit 11a comprises the hot source exchanger 14, the first cold source exchanger 12, the expansion tank 32 and a first pump P', while the second closed circuit 11b comprises the second cold source exchanger 12', the expansion tank 32 and a second pump P".

The first closed circuit 11a is a main circuit, while the second closed circuit 11b is a secondary circuit.

Thus, the heat transfer fluid C circulating in the secondary circuit 11b is withdrawn from the expansion tank 32 at a withdrawal point 33. More particularly, the withdrawal point 33 is disposed at a certain height "h1" in the expansion tank 32, such that the ratio between this height "h1" and the height "h2" of fluid above the withdrawal point 33 is close to the ratio of the fluid volumes present in the main and secondary circuits 11a and 11b, respectively. Thus, in case of perforation of the exchange surfaces of the second cold source exchanger 12', the level of heat transfer fluid C in the expansion tank 32 decreases until passing below the withdrawal point 33. The secondary circuit 11b is no longer supplied with heat transfer fluid C and the main circuit 11a can continue to operate normally. This form allows dispensing with the leak detection device 34, the valve 36 and the control system thereof in FIGS. 4 and 5.

The first P' and second P'" pumps allow the circulation of the heat transfer fluid C in the closed circuits 11a, 11b.

FIG. 7 illustrates more specifically the upstream section 104, comprising a first frame 105 for stopping bird impacts and a second frame 105' for stopping bird impacts.

The first bird stop frame 105 delimits the air inlet lip 106, while the second bird impact stop frame 105' delimits the upstream section 104. More specifically, the air inlet lip 106 extends upstream of the first bird stop frame 105, and the upstream section extends upstream of the second bird stop frame 105'.

The second bird impact stop frame 105' is at a fan 107 of the turbojet engine 126, or even slightly upstream of said fan 107. The upstream is designated by the arrow "f."

Downstream of the second frame 105', begins the middle section 110 comprising the cold source exchanger 12 (FIG. 3).

Upstream of the first bird impact stop frame 105, begins the air inlet lip 106.

The second cold source exchanger 12' as described with reference to FIGS. 4 to 6 is disposed in the air inlet lip 106.

In particular, the first cold source exchanger 12 is disposed on a thrust reverser and the second cold source exchanger 12' is disposed in the air inlet lip 106.

In a variant which is not represented, the second cold source exchanger 12' is disposed in the nacelle, in an area exposed to the debris impacts from the opposite propulsion unit of the aircraft 123 of FIG. 1, that is to say in the proximal lower dial of any one of the upstream 104, middle 110 and/or downstream 112 sections.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft comprising a fuselage disposed in a longitudinal plane of the aircraft, at least two propulsion units disposed in a plane transverse to the longitudinal plane of the aircraft on either side of the fuselage, and a nacelle of at least one of the at least two propulsion units, the nacelle suspended from a mast and defining a centerline axis and a circumferential direction about the centerline axis, wherein the centerline axis extends within each of a vertical plane and a lateral plane perpendicular to the vertical plane, the vertical plane bisecting the mast at an upper circumferential position of the nacelle, the nacelle comprising:
    four dials defined respectively between an upper point circumferentially aligned with the upper circumferential position of the nacelle and located in the vertical plane, a lower point diametrically opposed from the upper point and located in the vertical plane, a proximal lateral point relative to the longitudinal plane, the proximal lateral point located in the lateral plane, and a distal lateral point relative to the longitudinal plane, the distal lateral point diametrically opposed from the proximal lateral point and located in the lateral plane, the four dials including a proximal upper dial, a distal upper dial, a proximal lower dial, and a distal lower dial;
    an upstream section comprising a leading edge forming an air inlet lip;
    a middle section;
    a downstream section comprising a trailing edge;
    at least one surface heat exchanger including a cold source exchanger between a heat transfer fluid and a cold air flow, the cold source exchanger being integrated into a closed circuit in which the heat transfer fluid circulates, and the entirety of the cold source exchanger being disposed in at least one of the proximal upper dial, the distal upper dial and the distal lower dial such that the cold source exchanger is circumferentially spaced from each of the vertical plane and the lateral plane, the cold source exchanger further positioned in at least one of the middle section and the downstream section; and
    an outer structure comprising an outer fairing defining an outer aerodynamic surface, and an inner fairing defining an inner aerodynamic surface, the inner and outer fairings being connected upstream by the leading edge forming the air inlet lip, and the cold source exchanger being in contact with at least one of the inner fairing and the outer fairing of the nacelle,
    wherein an outer surface of the cold source exchanger is formed at least partially by a double wall of at least one of the inner fairing and the outer fairing of the nacelle.

2. The aircraft according to claim 1, further comprising an expansion tank disposed in the closed circuit in order to define at least one of a maximum pressure and a minimum pressure in portions of the closed circuit.

3. The aircraft according to claim 1, wherein the cold source exchanger is a first cold source exchanger of at least two cold source exchangers disposed within the nacelle.

4. The aircraft according to claim 3, wherein at least one cold source exchanger of the at least two cold source exchangers is in contact with the inner fairing of the nacelle and at least one cold source exchanger of the at least two cold source exchangers is in contact with the outer fairing of the nacelle.

5. The aircraft according to claim 3, wherein a second cold source exchanger of the at least two cold source exchangers is disposed in at least one of the upstream section and the proximal lower dial.

6. The aircraft according to claim 5, further comprising an expansion tank disposed in the closed circuit in order to define at least one of a maximum pressure and a minimum pressure in portions of the closed circuit, wherein the first cold source exchanger is integrated into a main circuit and the second cold source exchanger is integrated into a secondary circuit such that the heat transfer fluid circulating in the secondary circuit is withdrawn from the expansion tank at a withdrawal point.

7. The aircraft according to claim 6, wherein the withdrawal point is at a height such that a ratio between the height of the withdrawal point and a height of heat transfer fluid remaining above the withdrawal point is close to a ratio of heat transfer fluid volumes present in the main circuit and the secondary circuit, respectively.

8. The aircraft according to claim 3, wherein the at least two cold source exchangers are integrated in parallel in the closed circuit.

9. The aircraft according to claim 8, further comprising a valve allowing closing of heat transfer fluid circulation in at least one cold source exchanger of the at least two cold source exchangers, wherein a second cold source exchanger of the at least two cold source exchangers is disposed in at least one of the upstream section and the proximal lower dial.

10. The aircraft according to claim 9, further comprising a leak detection device for detecting a leak in the second cold source exchanger.

11. The aircraft according to claim 3, wherein the at least two cold source exchangers are integrated into different closed circuits.

12. The aircraft according to claim 3, wherein a second cold source exchanger of the at least two cold source exchangers is disposed at least partially in the air inlet lip.

13. The aircraft according to claim 1, further comprising additional cold source exchangers, each additional cold source exchanger being disposed in at least one of the proximal upper dial, the distal upper dial, and the distal lower dial, and in at least one of the middle section and the downstream section.

14. The aircraft according to claim 1, further comprising additional cold source exchangers, each additional cold source exchanger being disposed in at least one of the proximal upper dial and the distal upper dial, and in at least one of the middle section and the downstream section of the nacelle.

15. The aircraft according to claim 1, further comprising additional cold source exchangers, each additional cold source exchanger being disposed in at least one of the distal upper dial and the distal lower dial.

\* \* \* \* \*